United States Patent [19]

Neitzel et al.

[11] 3,852,044

[45] Dec. 3, 1974

[54] RECOVERY OF SUBSTANTIALLY POTASSIUM-FREE HYDRATED MAGNESIUM CHLORIDE FROM CONTAMINATED AQUEOUS SOLUTIONS

[75] Inventors: Ulrich E. G. Neitzel; Hans Gerhard Flint; Jerome A. Lukes, all of Ogden, Utah

[73] Assignee: Great Salt Lake Minerals & Chemicals Corporation, Ogden, Utah

[22] Filed: Nov. 13, 1969

[21] Appl. No.: 876,306

[52] U.S. Cl. .................... 23/298, 23/300, 23/302, 23/303, 23/304, 423/158, 423/184
[51] Int. Cl. ........ B01d 9/02, C01d 1/30, C01f 5/26
[58] Field of Search ............ 23/300, 296, 297, 298, 23/302, 304, 303, 312 AW, 91, 90, 37, 38, 39, 312 AH, 399

[56] References Cited
UNITED STATES PATENTS

| | | | |
|---|---|---|---|
| 1,359,782 | 11/1920 | Barstow | 23/91 |
| 2,479,001 | 8/1949 | Burke | 23/298 |
| 2,687,339 | 8/1954 | Dancy | 23/302 |
| 3,096,152 | 7/1963 | Hadzeriga | 23/91 |
| 3,342,548 | 9/1967 | Macey | 23/91 |
| 3,432,258 | 3/1969 | Ferris | 23/91 |
| 3,484,195 | 12/1969 | Lewis et al. | 23/38 |

FOREIGN PATENTS OR APPLICATIONS
67,461  10/1960  India

*Primary Examiner*—A. Louis Monacell
*Assistant Examiner*—S. J. Emery
*Attorney, Agent, or Firm*—Trask & Britt

[57] ABSTRACT

Aqueous solutions containing magnesium chloride as the major dissolved salt but contaminated with sulfate, potassium and sodium to the extent that magnesium chloride produced by evaporating the solution is unacceptably contaminated with potassium, sodium, and sulfate impurities are concentrated to at least near magnesium chloride hexahydrate saturation and are then cooled sufficiently to reduce the potassium concentration to below about 1 mole and the sodium concentration to below about 1½ moles per 1000 moles water. The thus-concentrated solutions are then treated to the extent necessary to reduce the concentration of sulfate to below about 4 moles per 1000 moles water. The remaining brine is evaporated to obtain substantially pure, hydrated magnesium chloride, usually bischofite, containing no more than a few parts per million of potassium impurity. The process is particularly adapted to the production of substantially pure bischofite from brines of the type occuring in the Great Salt Lake of Utah.

8 Claims, 1 Drawing Figure

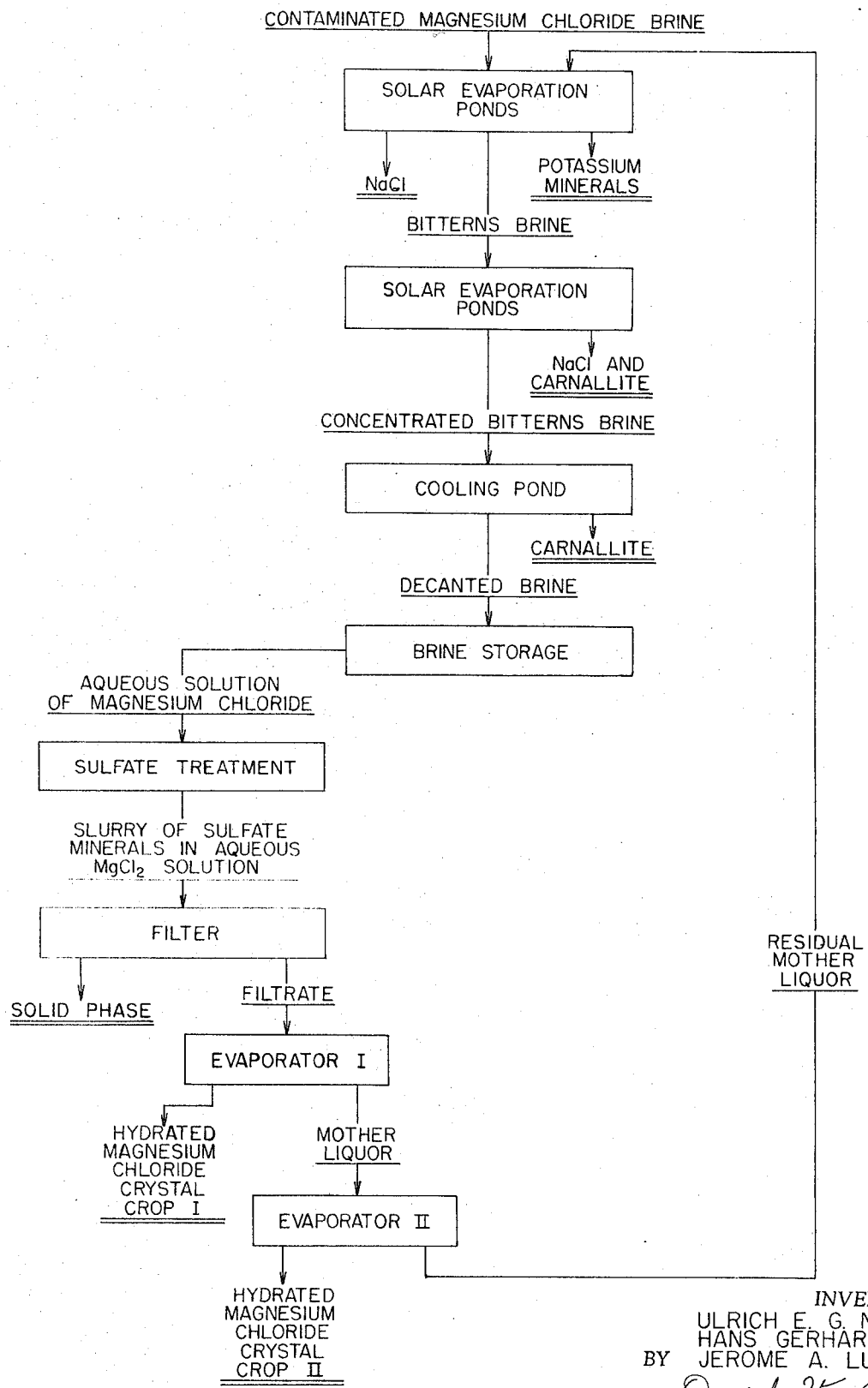

RECOVERY OF SUBSTANTIALLY POTASSIUM-FREE HYDRATED MAGNESIUM CHLORIDE FROM CONTAMINATED AQUEOUS SOLUTIONS

BACKGROUND OF THE INVENTION

1. Field

This invention relates to the recovery of substantially pure, hydrated magnesium chloride from contaminated brines. Specifically, it relates to the recovery of substantially pure bischofite from magnesium chloride brines contaminated with sodium, potassium and sulfate impurities; it is particularly directed to the minimization of potassium impurity in the hydrated magnesium chloride product.

2. State of the Art

It is known to evaporate magnesium chloride brines contaminated with dissolved sulfate, potassium, and sodium values to recover hydrated magnesium chloride crystal crops. The crystal crops obtained in this fashion have been contaminated with varying amounts of sulfate, potassium and sodium impurities. For example, brines of the type occurring in the Great Salt Lake of Utah may be treated in solar ponds or otherwise to recover sodium chloride and potassium-containing minerals. They may be further evaporated to produce hydrated magnesium chloride, usually bischofite. The bischofite obtained in this fashion is contaminated with magnesium sulfate hydrates, potassium-containing impurities (notably carnallite), and sodium chloride.

Various procedures are known whereby contaminated bischofite can be purified. Such procedures are time consuming and expensive. For example, contaminated bischofite crystal crops may be contacted with a basic solution, thereby converting the bischofite to magnesium hydroxide and dissolving the potassium, sodium, and sulfate impurities. The magnesium hydroxide may be filtered and converted to magnesium chloride by contacting it with hydrochloric acid. It would be desirable to avoid the necessity for these purification procedures by producing a substantially pure bischofite (or other hydrated magnesium chloride species) in the first instance.

Many processes have been suggested for producing hydrated magnesium chloride crystal crops substantially free from sulfate impurities. When such processes are applied to brines containing dissolved alkali metal salts, the hydrated magnesium chloride produced tends to be contaminated with undesirably high concentrations of the alkali metals, particularly potassium. For many industrial applications, it is necessary for the hydrated magnesium chloride product to contain very low levels of potassium, ideally no more than in the parts per million range. Heretofore, it has been difficult to obtain such products in satisfactory yield from brines containing even small concentrations of dissolved potassium and sodium; e.g., as little as about 6 moles combined sodium and potassium per 1,000 moles $H_2O$.

RELATED APPLICATIONS

Commonly assigned, co-pending U.S. applications Ser. No. 735,840, filed June 10, 1968; Ser. No. 756,071, filed Aug. 28, 1968; and Ser. No. 807,573, filed Mar. 17, 1969 disclose inventions involving various procedures for manipulating brine in solar ponds. These solar pond inventions are all ultimately productive of "bitterns brines" useful for the production of hydrated magnesium chloride. If the bitterns brines produced by the aforesaid solar pond inventions are evaporated directly, they produce bischofite crystal crops contaminated with substantial amounts of sulfate, potassium, and sodium impurities.

Commonly assigned U.S. application Ser. No. 867,336, filed Oct. 17, 1969 and Ser. No. 867,337, filed Oct. 17, 1969 disclose processes for the recovery of sulfate-free, hydrated magnesium chloride from bitterns brines of the type produced by the aforesaid solar pond inventions. The later-filed applications are directed to the problem of obtaining hydrated magnesium chloride, notably bischofite, substantially free from sulfate impurities. They are not particularly directed to the problem of potassium and/or sodium ion contamination of the crystal crop.

The present application discloses and claims a process specifically directed to the recovery of hydrated magnesium chloride crystal crops substantially free from potassium contamination, and if desired, substantially free from both potassium and sodium contamination. The process of this invention is particularly suitable for use in conjunction with the earlier-described processes for producing sulfate-free, hydrated magnesium chloride crystal crops from bitterns brines.

SUMMARY OF THE INVENTION

This invention provides a process for treating aqueous solutions of magnesium chloride containing substantial quantities of potassium, sodium and sulfate impurities to recover hydrated magnesium chloride, substantially free from potassium contamination. The process may be conducted in conjunction with other physical processes for the production of substantially pure bischofite (or other hydrated magnesium chloride products) substantially free from potassium and sodium and containing sufficiently low concentrations of sulfate contamination to be suitable as feed material to electrolytic cells for the production of electrolytic magnesium.

This invention is useful for the recovery of hydrated magnesium chloride from any aqueous solution containing magnesium, sodium, potassium, chloride and sulfate in proportions such that, upon evaporation, contaminated hydrated magnesium chloride crystal crops are produced; i.e., hydrated magnesium chloride containing unacceptable quantities of sulfate, potassium and/or sodium contamination. It is particularly well suited for treatment of brines of the type occurring in the Great Salt Lake of Utah. Of course, many constituents other than those specifically mentioned may be present in the brine, provided they are present in less than contaminating concentrations; i.e., in concentrations below that at which they will crystallize with magnesium chloride as a consequence of the process. Moreover, it is recognized that to produce products of high purity, conventional washing procedures are generally required to remove entrained solution from the crystal crop. Such washing procedures may also be relied upon to remove minor amounts of co-crystallized mineral species.

According to the present invention, aqueous solutions of the aforedescribed type (notably bitterns brines produced by the evaporation of Great Salt Lake brines to produce sodium chloride and potassium-containing crystal crops) are concentrated to at least near magnesium chloride saturation to force potassium chloride and sodium chloride from solution. Concentration is conveniently accomplished in solar evaporation ponds during the evaporation season. Brines such as the bitterns brines derived from the Great Salt Lake of Utah are typically concentrated with respect to magnesium chloride sufficiently to suppress the solubility of potassium and sodium salts to the extent that the total, combined concentration of potassium and sodium ions remaining in solution is less than about 3 moles per 1,000 moles $H_2O$.

It should be noted that to reduce the concentration of potassium and sodium to the levels suggested by this invention requires concentrating the solution with respect to magnesium chloride considerably beyond the concentrations normally suggested for solar pond operations having as their objective, the production of bitterns brines. For example, bitterns brines derived from the Great Salt Lake of Utah are concentrated to at least about 85 moles $MgCl_2$ per 1,000 moles of water. According to the procedures suggested by the prior art, bitterns brines would be removed from a solar pond area before achieving this high level of $MgCl_2$ concentration.

The thus-concentrated bitterns brine may be recovered, by decantation or otherwise, and is subjected to cooling to further decrease the concentration of potassium therein. For purposes of the present invention, the potassium ion concentration in solution should be reduced to less than about 1, preferably below about one-half mole of potassium per 1,000 moles of water in the brine. The sodium concentration should be below about 1½ moles per 1,000 moles of water. If, as a result of the preceding concentration procedure, the concentration of potassium ions is already near or below the prescribed maximum level, the cooling procedure will nevertheless beneficially reduce the potassium ion concentration even further. The cooling procedure may be conveniently conducted in outdoor empondments, such as deep storage ponds in a solar evaporation system. (Sometimes cooling is done in the solar evaporation ponds without transferring the brine.) In that event, normal winter temperatures are relied upon for cooling. Temperatures of approximately 0° C are sufficient in most instances, although lower temperatures are beneficial, and it is recognized that in some locations, winter cooling may not be sufficient to achieve such low temperatures. If additional cooling is required, it can be accomplished by artifical means.

Brines treated as aforedescribed may be recovered and treated in any convenient fashion to remove sulfate. It is important to reduce the sulfate concentration appreciably so that the capacity of the residual aqueous phase to dissolve potassium and sodium is increased. The brines may be chemically treated to remove sulfate by contacting them with calcium chloride and/or barium chloride. Alternatively, the brines may be evaporated to crystallize artificial kieserite ($MgSO_4 \cdot 5/4H_2O$) at high temperatures and the resulting hot magnesium chloride solution may be treated with calcium chloride and/or barium chloride to remove residual sulfate. Ion exchange and solvent extraction techniques may also be used, if desired.

When the brine contains sufficient concentration of sulfate that kieserite is metastable, then the procedures disclosed and claimed by copending application Ser. No. 867,336, the disclosure of which is hereby incorporated by reference to the extent it is applicable hereto, may be relied upon to remove sulfate. In some instances, the brine may be recovered in a slurry containing sulfate-contaminated bischofite, hydrated magnesium sulfate, and other impurities (such as sodium chloride) in the solid phase. In those instances, sulfate may be removed in accordance with the teachings of the co-pending application Ser. No. 867,336, the disclosure of which is hereby incorporated by reference to the extent it is applicable hereto. In any event, the concentration of sulfate in the aqueous phase is desirably reduced to below about 4 moles per 1,000 moles of water without substantially increasing the concentration of sodium and/or potassium.

The aqueous phase of the resulting slurry should be separated from any solid phase materials in contact therewith. It may then be evaporated to produce an aqueous slurry of bischofite (or other hydrated magnesium chloride crystal crops, depending upon the conditions selected) containing substantially no potassium and substantially no or very little sodium contamination. The precise conditions of evaporation are not critical, but the slurry should be held within a prescribed temperature range before the solid phase is recovered to minimize the potassium content of the solid phase. Evaporation (or subsequent holding) should thus be at a temperature at which upon further evaporation the aqueous phase will become saturated with sodium salts before it becomes saturated with potassium salts. Suitable temperatures range from about 60° to about 100°C, with the range of about 70° to about 80°C being generally preferred.

By separating the aqueous phase from the resulting hydrated magnesium chloride crystal crop while the aqueous phase is still unsaturated with respect to sodium chloride, a crystal crop containing substantially no solid potassium or sodium species is recovered. The crystal crop may be washed in conventional fashion to remove entrained brine so that the potassium and sodium contaminants may be reduced to any desired level. The total concentration of potassium and sodium may conveniently be reduced to below about 50 parts per million by weight, for example. Less extensive washing is often satisfactory, however, when this high degree of purity is not required.

The residual aqueous phase may be again subjected to evaporation at elevated temperatures (or evaporation followed by a holding period at a selected temperature at which the aqueous phase will become saturated with sodium salts before it becomes saturated with potassium salts) to produce a second slurry, the solid phase of which contains hydrated magnesium chloride and a small amount of sodium chloride. The solid phase may be separated from the aqueous phase while the aqueous phase is unsaturated with respect to potassium chloride. Such a crystal crop is a valuable item of commerce even without further purification, although appropriate steps may be taken to dissolve the sodium chloride therefrom.

After the removal of sulfate from the brine recovered from the solar ponds, the resulting magnesium chloride solution may be treated in a variety of ways to produce acceptable crystal crops of hydrated magnesium chloride. At the high concentrations of magnesium chloride contained in the solutions, if the solution is simply allowed to cool to room temperature it will solidify, entrapping all of the sulfate, potassium and other impurities in the brine. Thus, it is usually preferable to rely upon a crystallization procedure which yields a higher grade of hydrated magnesium chloride products. Various combinations of cooling and evaporation may be employed to obtain low-sulfate bischofite products from brine which is still supersaturated with respect to magnesium sulfate. To produce a good product, however, it is effective to conduct the evaporation at a temperature sufficiently low and at a rate sufficiently high to avoid crystallization of magnesium sulfate. The evaporation may be conducted under vacuum at a temperature lower than about 90° C, preferably below about 80° C, and rarely above 100° C. Evaporation may be continued until the solubility limit of magnesium chloride in the brine is exceeded or it may be discontinued prior to the formation of a crystal crop. It is sometimes advantageous to first evaporate under vacuum to obtain a saturated $MgCl_2$ brine, which may contain crystallized bischofite, and then cool the brine to obtain a crystal crop. The depleted brine is then again subjected to vacuum evaporation, preferably at lower temperatures, and is again cooled to obtain a second crystal crop. In this fashion, bischofite recovery is accomplished at reduced average temperatures and at higher rates, thereby discouraging the concurrent crystallization of magnesium sulfate minerals.

An ideal method for recovering good quality, hydrated magnesium chloride from the magnesium chloride solutions of this invention is to introduce the concentrated magnesium chloride solution to a crystallization zone operating at a temperature sufficient to prevent solidification of the solution, typically about 60° C, usually between about 45° and about 85° C, wherein a mother liquor saturated with respect to magnesium chloride and undersaturated with respect to magnesium sulfate is continuously recycled. A typical recycling mother liquor contains between about 95 and about 110 moles of magnesium chloride, about ½ to about 1½ moles of potassium, and up to about 8 moles of $MgSO_4$ per 1,000 moles of water at 60° C. A portion of the mother liquor is continuously purged to prevent undue build-up of sulfate in the crystallizer. Typically, bischofite is recovered in this fashion, although it is possible, by adjusting the operating conditions appropriately, to recover either the dihydrate or tetrahydrate magnesium chloride species.

Recovery of the hydrated magnesium chloride from the residual brine may be effected by any convenient physical separation procedure. Filtration is normally convenient, for example.

BRIEF DESCRIPTION OF THE DRAWINGS

The single FIGURE of the drawings is a flow sheet illustrating the best mode presently contemplated for carrying out the invention.

DESCRIPTION OF THE ILLUSTRATED EMBODIMENTS

As illustrated, the invention contemplates subjecting magnesium chloride brine contaminated with sodium, potassium and sulfate-bearing materials to solar evaporation to produce NaCl and potassium minerals. The resulting bitterns brine is subjected to further solar evaporation to concentrate it further with respect to magnesium chloride, thereby forcing carnallite and additional NaCl from solution. The resulting concentrated bitterns brine contains only minor amounts of potassium and sodium in solution. The thus-concentrated brine is subjected to winter cooling to further reduce the potassium concentration in the aqueous phase. The aqueous phase is decanted and stored for further treatment. The stored aqueous solution is withdrawn as required and is treated to remove sulfate, thereby increasing the capacity of the remaining aqueous phase to dissolve potassium and sodium. The sulfate-containing solid phase is removed by filtration or other convenient means, and the residual aqueous phase is subjected to successive evaporation procedures to recover hydrated, magnesium chloride crystal crops.

The following example is illustrative of the invention as applied to the treatment of brines taken from the Great Salt Lake of Utah.

Brine from the Great Salt Lake of Utah is subjected to solar evaporation in accordance with the precedures of U.S. Pat. application Ser. No. 735,840, the disclosure of which is hereby incorporated by reference, or by any other convenient solar evaporation technique, to produce potassium-containing crystal crops. The residual (bitterns) brine is further concentrated to produce concentrated bitterns brine analyzing approximately 10 moles $MgSO_4$, 95 moles $MgCl_2$, 0.5 mole $K_2Cl_2$, and 0.8 moles $Na_2Cl_2$ per 1,000 moles water. This concentrated magnesium chloride brine is recovered from the solar evaporation ponds and is stored in an outdoor empondment during the winter season. At the coldest part of the season, when temperatures are approximately 0° C, the emponded brine is decanted and stored. For each mole part unit (MPU); i.e., for each quantity of brine containing 1,000 moles of $H_2O$, subjected to winter cooling there is decanted approximately 0.96 MPU of a brine analyzing approximately 5 moles $MgSO_4$, 98.33 moles $MgCl_2$, 0.2 moles $K_2Cl_2$, and 0.835 moles $Na_2Cl_2$ per 1,000 moles $H_2O$. This quantity of stored brine is treated generally in accordance with the procedures of the aforementioned U.S. Pat. applications Ser. No. 867,336 to remove sulfate in the form of artificial kieserite. Thus, the stored brine is taken and evaporated at between about 50° and about 80° C until it contains at least about 7 moles of $MgSO_4$ per 1,000 moles $H_2O$. Its temperature is then rapidly increased to promote the crystallization of a substantial quantity of kieserite muclei and is held at temperatures between about 100° and 140° C for sufficient duration to permit approximately 2.33 moles of artificial kieserite ($MgSO_4·5/4H_2O$) to precipitate. The kieserite crystal crop is removed by filtration, and the residual concentrated magnesium chloride solution is evaporated at approximately 75° C. Approximately 189 moles of water are removed, thereby forming a first bischofite crystal crop of approximately 25.34 moles $MgCl_2·6H_2O$. The first bischofite crystal crop is recovered, and the residual mother liquor is subjected to additional vacuum evaporation at approximately 75° C. An additional 113 moles of water are removed, thereby forming a second bischofite crystal crop containing approximately 38.42 moles of bischofite and approximately 0.94 moles of NaCl. The crystal crops are washed in conventional fashion to flush away entrained brine. Depending upon the extent of washing, washed crystal crops analyze as low as 20 parts per million potassium contaminants. Approximately 0.274 MPU of mother liquor is recovered from the second evaporation step. This final mother liquor analyzes approximately 9 moles $MgSO_4$, 112 moles $MgCl_2$, 0.7 moles $K_2Cl_2$, and 1.2 moles $Na_2Cl_2$ per 1,000 moles $H_2O$ and is recycled to the solar evaporation ponds for the removal of potassium and sodium as previously described.

Although the invention has been described with reference to certain details of specific embodiments, many variations are within contemplation. For example, as previously indicated, the recovery of bischofite from solutions adjusted in composition in accordance with this invention may be accomplished by a variety of procedures. Although vacuum evaporation is straightforward and convenient, the important consideration from the standpoint of this invention is generally the temperature of the mother liquor when the bischofite crystal crop is separated therefrom. As a rule of thumb, the potassium ion concentration of the brine should ordinarily increase within the range of about 15 to about 100 percent to produce a substantially potassium-free bischofite product. Nevertheless, the primary control parameter is that the bischofite crystal crop be recovered while the mother liquor is unsaturated with respect to sodium (and thus also with respect to potassium). It is recognized that in some instances crystallization may be conducted under conditions which involve the co-crystallization of sodium and/or potassium crystal species. In such event, the resulting bischofite slurry may be held at a higher temperature, typically between about 60° and about 90° C to ensure redissolution of the co-precipitated potassium and sodium material. The purification procedures of this invention in no way detract from the capability of known sulfate-removal processes to produce bischofite crystal crops substantially free from sulfate impurities. In some instances, larger amounts of potassium impurity are tolerable in the hydrated magnesium chloride product. In those instances, the various procedures described herein may be less rigorously applied. In any event, the claimed invention is capable of producing hydrated magnesium chloride with substantially no potassium, and even when practiced under less than optimum conditions, routinely produces crystal crops of exceptional purity, typically analyzing less than 500, usually less than 100 parts per million by weight potassium.

What is claimed is:

1. A process for the production of magnesium chloride from aqueous solutions containing magnesium, chloride, sulfate, sodium, and potassium ions in proportions such that simple evaporation of the solution would produce a crystal crop of hydrated magnesium chloride contaminated with unacceptable amounts of potassium, which comprises:

concentrating said aqueous solution with respect to magnesium chloride sufficiently to depress the solubility of potassium and sodium salts in said solution thereby to effect the removal of such salts from solution so that the combined concentration of sodium and potassium remaining in said solution is less than about 3 moles per 1,000 moles of water;

cooling said solution sufficiently to further depress the solubility of potassium thereby to effect the removal of potassium from solution so that the concentration of potassium in solution is reduced to a level below about 1 mole per 1,000 moles water;

recovering the solution substantially free from solid sodium and potassium salts;

treating the solution as required to establish the concentration of sulfate therein below about 4 moles per 1,000 moles water without substantially increasing the concentration of sodium or potassium therein;

evaporating the solution to cause the hydrated magnesium chloride to crystallize therefrom, thereby forming a slurry of hydrated magnesium chloride, and holding said slurry at a temperature at which, upon further evaporation, the aqueous phase will become saturated with sodium salts before it becomes saturated with potassium salts; and recovering the hydrated magnesium chloride from said slurry while the aqueous phase thereof is unsaturated with respect to sodium chloride.

2. A process according to claim 1, wherein the potassium concentration is reduced by cooling to below about ½ mole per 1,000 moles of water.

3. A process according to claim 2, wherein
the aqueous phase of the slurry is removed from the solid phase thereof;
said aqueous phase is subjected to further evaporation to cause the crystallization of additional hydrated magnesium chloride, thereby forming a second aqueous slurry and said second slurry is held at a temperature at which upon further evaporation the aqueous phase will be saturated with sodium salts before it becomes saturated with potassium salts; and
the solid phase of said slurry is recovered while the aqueous phase is unsaturated with respect to potassium chloride.

4. A process according to claim 1, wherein the initial aqueous solution treated for the production of magnesium chloride is derived from a brine of the type occurring in the Great Salt Lake of Utah.

5. A process according to claim 4, wherein
a brine is concentrated to above about 95 moles of $MgCl_2$ per 1,000 moles of water to form a concentrated bitterns brine;
the concentrated bitterns brine is recovered and subjected to evaporative concentration to remove sulfate values at sufficiently high temperatures to avoid crystallization of substantial amounts of magnesium chloride thereby forming a slurry of sulfate-containing minerals in the aqueous phase;
the said aqueous phase is recovered from the solid phase; and
the aqueous phase is subjected to evaporation to form a crystal crop of hydrated magnesium chloride.

6. A process according to claim 5, wherein
the initial solution is derived from the Great Salt Lake of Utah; and
said solution is first concentrated by solar evaporation and is then subjected to winter cooling in an empondment to produce the said concentrated bitterns brine containing at least about 95 moles of $MgCl_2$ and less than about 0.2 mole of potassium per 1,000 moles water; and
the aqueous phase is decanted from said empondment at low winter temperatures.

7. A process according to claim 1, wherein after the solution is treated to establish the said low concentrations of potassium and sulfate therein, it is evaporated at between about 45° and about 85° C until the concentration of potassium therein is increased to between about ½ and about 1½ moles per 1,000 moles of water, thereby producing a crystal crop of bischofite.

8. A process according to claim 7, wherein the bischofite crystal crop is washed with aqueous solvent to remove entrained brine, thereby to reduce the total concentrations of potassium and sodium therein to below about 50 parts per million by weight.

* * * * *

UNITED STATES PATENT OFFICE
CERTIFICATE OF CORRECTION

Patent No. 3,852,044          Dated December 3, 1974

Inventor(s) Ulrich E.G. Neitzel; Hans Gerhard Flint; Jerome A. Lukes

It is certified that error appears in the above-identified patent and that said Letters Patent are hereby corrected as shown below:

Col. 4, line 7, change Ser. No."867,336" to ---867,337----;

Col. 6, line 45, change "muclei" to ---nuclei---.

Signed and sealed this 4th day of February 1975.

(SEAL)
Attest:

McCOY M. GIBSON JR.
Attesting Officer

C. MARSHALL DANN
Commissioner of Patents